(12) United States Patent
Yang

(10) Patent No.: US 6,619,438 B1
(45) Date of Patent: Sep. 16, 2003

(54) CASTER BRAKING AND LOCKING STRUCTURE

(76) Inventor: Sung-Wang Yang, No. 258-15, An-Ting, An Chia Tsun, An Ting Shiang, Tainan Hsien (TW)

( * ) Notice: Subject to any disclaimer, the term of this patent is extended or adjusted under 35 U.S.C. 154(b) by 0 days.

(21) Appl. No.: 10/102,636

(22) Filed: Mar. 22, 2002

(51) Int. Cl.$^7$ .............................................. B60B 33/00
(52) U.S. Cl. .......................... 188/1.12; 188/31; 188/69
(58) Field of Search ........................... 188/1.12, 31, 69; 16/35 R

(56) References Cited

U.S. PATENT DOCUMENTS

| | | | |
|---|---|---|---|
| 4,669,580 A | * 6/1987 | Neville | 188/1.12 |
| 4,941,552 A | * 7/1990 | Screen | 188/1.12 |
| 5,181,587 A | * 1/1993 | Masatoshi | 188/1.12 |
| 5,368,133 A | * 11/1994 | Yang | 188/1.12 |
| 5,415,252 A | * 5/1995 | Estkowski | 188/1.12 |
| 5,537,715 A | * 7/1996 | Yang | 16/35 R |
| 5,617,934 A | * 4/1997 | Yang | 188/1.12 |
| 5,632,360 A | * 5/1997 | Melara | 188/1.12 |
| 5,988,323 A | * 11/1999 | Chu | 188/1.12 |
| 6,092,262 A | * 7/2000 | Lin | 16/35 R |
| 6,256,835 B1 | * 7/2001 | Wang | 16/35 R |
| 6,360,851 B1 | * 3/2002 | Yang | 188/1.12 |

* cited by examiner

Primary Examiner—Christopher P. Schwartz
Assistant Examiner—Devon Kramer
(74) Attorney, Agent, or Firm—Rosenberg, Klein & Lee

(57) ABSTRACT

A caster braking and locking structure comprises a caster holder having disposed at its bottom a rough; one end of the trough connecting through a shaft mouth inserted with a shaft being provided upwardly a recess; a slot formed in the shaft mouth in relation to the recess; a positioning ring provided with gaps being disposed on the shaft at where in relation to the slot; a slider holder subject to push by a flexible member being disposed in the trough; one end of the slider holder being extended into a long slot in the caster holder by means of a positioning pin; a retaining block subject to the push by another flexible member disposed in the recess being placed in the same end of the slider holder, a chute being vertically formed over another end of the trough containing a longitudinally disposed slider; the lower end of the slider being connected to the end of the slider holder to define a slope; a pivoting recess being provided to mount a press button pivoted with a circular pivot in the upper portion of the biased side of the caster holder that connecting chute; a retaining surface being provided to the circular pivot in relation to the upper end of the slider to push the slider to move downward and hold in position, thus for the slop at the lower end of the slider to hold against the slope at the end of the slider holder; in turn both of the slider holder and the retaining block moving laterally to execute braking and locking to the casters.

3 Claims, 3 Drawing Sheets

CASTER BRAKING AND LOCKING STRUCTURE

BACKGROUND OF THE INVENTION (a) Field of the Invention

The present invention relates to a caster braking structure, and more particularly, to one that executes braking to the caster and prevent it from turning by having a longitudinal slide linkage to indirectly drive two retaining elements to move laterally and respectively stop the caster and a vertical shaft.

(b) Description of the Prior Art

The present invention is a further improvement of application Ser. No. 09/754056 filed on Jan. 5, 2001. The prior art is essentially designed to have a single latching element to drive two laterally moving retaining members while applying braking to the caster and its vertical shaft, thus to stop and hold the caster from turning it direction. In the configuration of its physical structure, a horizontal accommodation trough is laterally formed in the flush side of a semi-spherical bottom of the caster holder. One end of the accommodation trough is formed upwardly a recess connecting through a vertically provided shaft mouth to receive the insertion of the shaft; a slot is upwardly formed in the shaft mouth relatively to the trough for the shaft and the slot to define a protrusion ring containing a positioning dent. A latching piece is pivoted at the other end of the trough with its pivoting portion formed a block with a distal and a proximal end in relation to the pivoting center. A laterally moving slider holder is provided in the trough and is constantly holding against the pivoting portion of the latching piece for being subject to the push by a flexible member. A cut is formed at the lower end where the push by the flexible member takes place so to facilitate turning the pivoting portion of the latching piece. At the other end a fixation pin is inserted through and extending further to rest in a long slot provided in the caster holder so to merely for the fixation pin to contact the circular groove formed on the inner side of the caster holder while at the same end of the slider holder is placed into a retaining block abutted to the groove. The retaining block being subject to the push by another flexible member holds against that end of the slider holder, and moves together with the lateral movement of the slider holder into the positioning dent disposed at the circular protrusion of the shaft in the slot to be held in position. Once the latching piece is depressed to apply double braking, the pivoting portion turns to have its distal end pushing into the slider holder for the fixation pin to extend and hold against the groove on the inner side of the caster to the apply brake to the caster. The retaining block as pushed by the flexible member advances together with the slider holder into the positioning dent in the circular protrusion of the shaft to prevent the caster from turning in any direction.

However, in exploring for a more practical design than the prior art, the latching piece must be provided on the side of the caster holder where the latching piece protrudes on the bias to form a "laterally protruding object" since in the configuration of the prior art, it is directly turned by means of the lacking piece to having the distal end of its pivoting portion to push the slider holder for the linked retaining members to execute double braking. Though the braking performance is not affected, such planning is detrimental to the appearance of the caster and such protruding object can easily trip the passer-by and a further improvement is justified.

SUMMARY OF THE INVENTION

The primary purpose of the present invention is to provide a caster braking and locking structure to have the latching piece (referred as a press button in the present invention) incorporated to the caster to be disposed at an appropriate location without excessive protrusion, and to have the latching piece indirectly driven via linkage of a longitudinally provided slider for both retaining members to synchronously execute lateral movement to respectively stop and lock characterized by that:

a vertically provided chute is formed over one side of the horizontal trough of the caster holder that contains the slider holder for the placement wherein a longitudinally provide slider. The lower end of the slider is connected to one end of the slider holder to define a slope and a pivoting recess if formed in the upper of the biased side of the caster holder, which connects the vertically provided chute. In the pivoting recess, a press button is relatively pivoted with its circular pivot. A wing is provided to the outer end of the circular pivot for depression. The circular pivot in relation to the upper end of the longitudinally provided slider is pushed and held in position by a retaining surface so the slider is pushed to move downward. Furthermore, the slop on the lower end of the slider pushes against that provided on the end of the slider holder for it to execute lateral movement together with the retaining block provided on the slider holder thus to apply brake to and prevent the caster from turning in any direction.

DETAILED DESCRIPTION OF THE PREFERRED EMBODIMENTS

Figure 1:
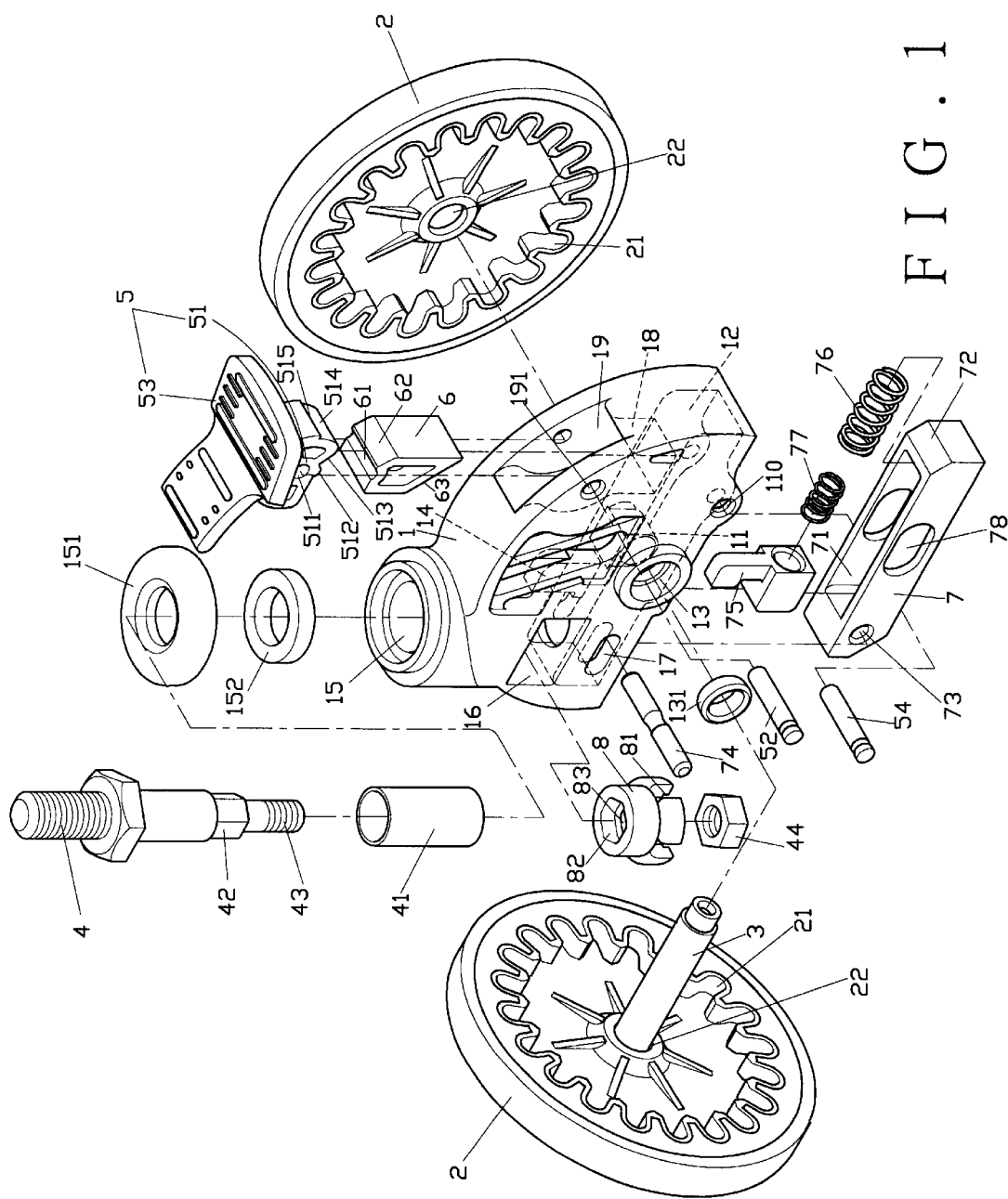
FIG. 1 is an exploded view showing a structure of a preferred embodiment of the present invention.

Referring to FIG. 1, a preferred embodiment of the present invention essentially comprises a caster holder (1), two half casters (2), an axle (3), a shaft (4), a press button (5), a slider (6), a slider holder (7), a fixation pin (74), a retaining block (75) and two flexible members (76) & (77).

The caster holder (1) is a semi-spherical object. A horizontal trough (12) is laterally provided in the caster holder (1) at its flush bottom and an axial mouth holder (II) is provided in the center of the trough (12). An axial hole (13) to receive the insertion of a collar (131) is each provided in both walls of the trough (12) at where corresponding to the axial mouth holder (11). One end of the trough (12) is formed upwardly a recess (14) connecting through a vertically provided shaft mouth (15). A slot (16) is formed in the shaft mouth (15) in relation to where the trough (12) is connected to the recess (14). A guide slot (17) is each provided in both sides at one end of the trough (12) where in relation to the axial mouth (15). Above the other side of the trough (12) not connecting through the axial mouth (15), a vertical chute (18) is separately provided. A pivoting recess (19) is formed in the upper side of the holder (1), which communicates the chute (18). A through hole (191) is each laterally provided on the walls of the pivoting recess (19) and a pinhole (110) is each laterally provided at the lower edge on both sides of the trough (12) at where in relation to the pivoting recess (19) to receive insertion of a positioning pin (54) to be described later.

Both casters (2) is each provided inside on the peripheral to the center an S-shaped continuous groove (21) and an axial base (22) provided at its center to allow the insertion by the axle (3) through the axial mouth holder (11) of the caster holder (1) before being respectively fixed at both ends of the axle (3) the two casters (2).

The shaft (4) is inserted through the shaft mouth (15) of the caster holder (1). A bearing bushing (41) is inserted to the middle section of the shaft (4) with its top secured with a shaft cover (151), which is connected to the shaft mouth (15) having in its upper end provided with a bearing ring (152). A positioning ring (8) is connected to the lower end of the shaft (4) at where in relation to the slot (16). A plurality of gaps (81) at proper spacing and equal angle among one another are provided to the periphery of the positioning ring (8). At the lower part of the shaft (4) is graded with polygonal surface (42) and a threaded rod (43) to engage a polygonal recess (82) and a through hole (83) provided inside the positioning ring (8) and to be secured with a nut (44) engaged with the threaded rod (43) to pack the positioning ring (8).

The press button (5) being supported by a circular pivot (51) having at its center disposed with a pivoting hole (511) is disposed in the inner end of the pivoting recess (19) in the upper part of the caster holder (1). The press button (5) turns as it is pivoted to the caster holder (1) with a pin (52) passing the through hole (191). A recessed segment may be provided below the circular pivot (51) to serve as a retaining surface. A protrusion (512) and a slope (513) are respectively provided at the center and one side of the retaining surface. The slope (513) extends further towards to form an arc concave (514) with a gradation edge (515) at its terminal while a wing (53) is formed at the outer end of the circular pivot (51) to be depressed when braking is desired.

The slider (6) is longitudinally disposed in the vertical chute (18) of the caster holder (1). A dent (61) and a shorter slop (62) respectively corresponding to the protrusion (512) and the slope (513) are provided at the upper end of the slider (6) while a longer slope (63) is separately formed at the lower end of the slider (6).

The slider holder (7) is mounted in the trough (12) at the bottom of the caster holder (1). A chute (71) is formed in the center at where in relation to the axial mouth holder (11) and penetrated with the axle (3) through slots (78) provided at two sides of the slider holder (7). One end of the slider holder (7) constantly moves towards the lower end of the slider (6) for being subject to the push by the flexible member (76). A slope (72) is formed at the end of the slider holder (7) that constantly holds against the slider (6) to compromise the push executed by the slope (63) at the lower end of the slider (6). The other end of the slider holder (7) is provided with an insertion hole (73) to allow the laterally inserted fixation pin (74) for the fixation pin (74) to pass through the guide slots (17) with both ends of the fixation pin (74) expose out of the guide slots (17). The positioning pin (54) passing through the pin holes (110) provided at the lower edge of the trough (12) at the bottom of the caster holder (1) holds against the lower side of the slider holder (7) where provided with the slop (72).

The retaining block (75) is provided in the slider holder (7) at the end where the fixation pin (74) is located, and is abutted to the recess (14) in the caster holder (1). Another flexible member (77) is laterally received in the hollow portion at the bottom of the retaining block (75) in the slider holder (7) so to press the retaining block (75) to secure on the side at the end of the slider holder (7).

Figure 2:
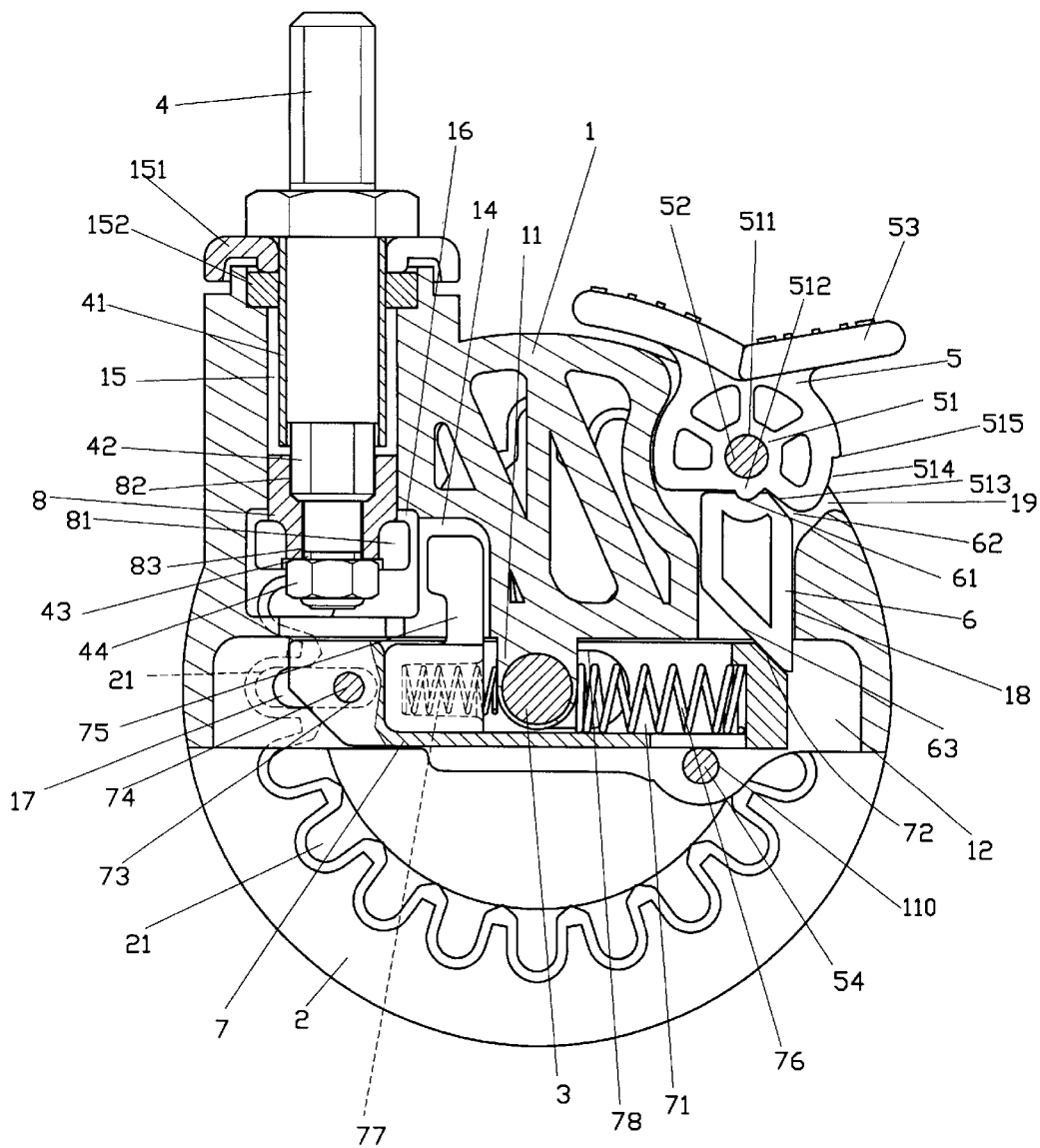
FIG. 2 is a sectional view of an assembly of the preferred embodiment before exercising the braking.

Now referring to FIG. 2, a caster of the present invention comprising the members as disclosed above is in the state before applying the brake. Wherein, the trough (12) at the bottom in the caster holder (1) accommodates the slider holder (7) that is capable of exercising lateral motion. For being pushed by the flexible member (76), the slider holder (7) has its slope (72) provided at the upper end on one side to attach to the slope (63) on the lower end of the slider (6). Meanwhile the other end of the slider holder (7) is connected to the retaining block (75), which is secured in place for being pushed against by the flexible member (77). Furthermore, before the press button (5) is not yet pressed, the press button (5) is held in position as the protrusion (512) at the center of the retaining surface defined by the recessed segment in the lower side of the circular pivot (51) is inserted into the dent (61) at the upper end of the slider (6). On the other hand, the fixation pin (74) at one end of the slider holder (7) clears away from the groove (21) on the inner side of the casters (2) for the caster (2) to turn. Given with the status that the retaining block (75) subject to the push from the flexible member (77) is held in position at the end surface of the slider holder (7), the upper portion of the retaining block (75) is located at a place out of the positioning ring (8) connected to the shaft (4), thus merely to allow the caster holder (1) to rotate for changing its direction in relation with the shaft (4).

Figure 3:
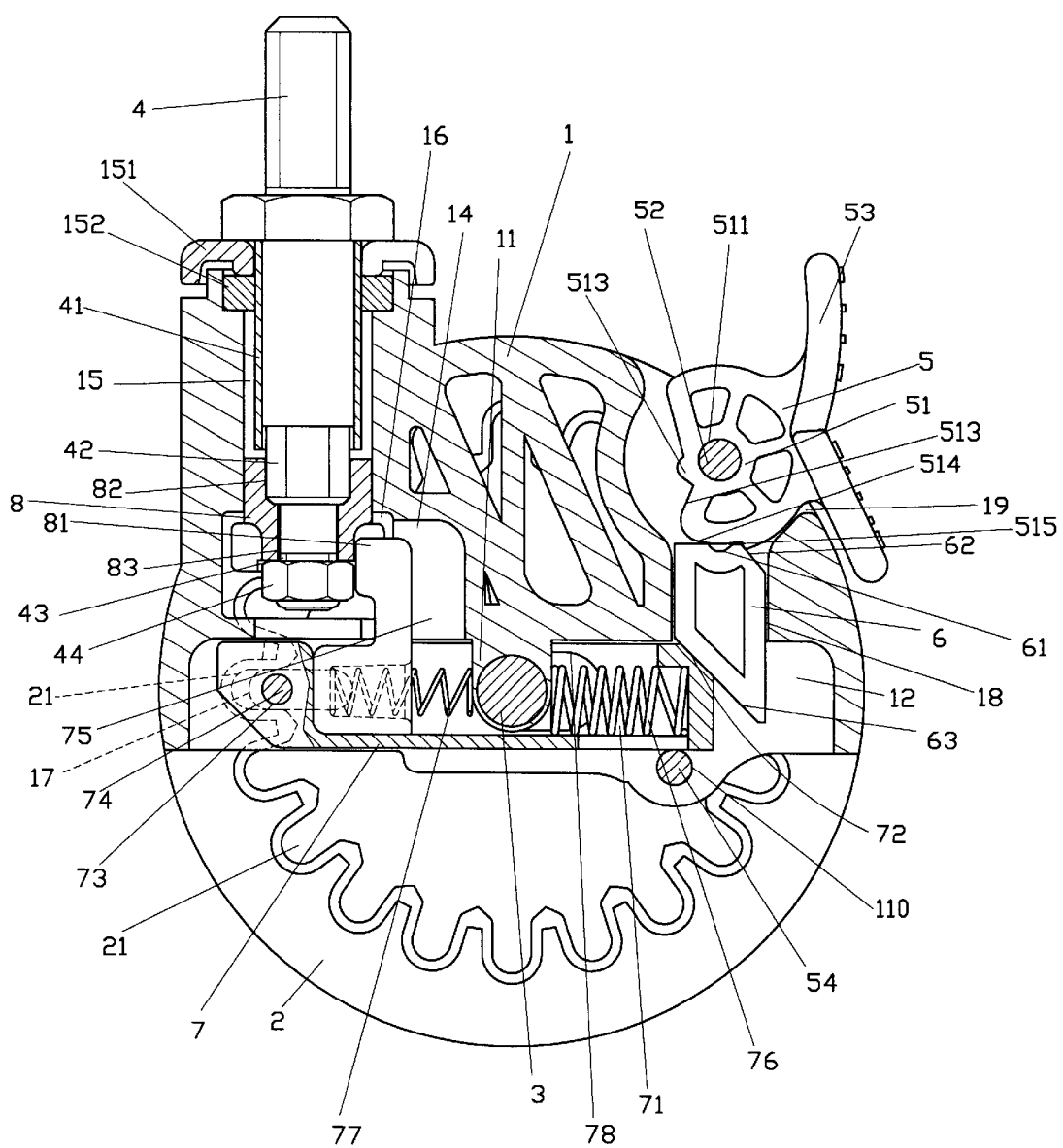
FIG. 3 is a schematic view showing that the preferred embodiment after the braking is executed.

Furthermore, as illustrated in FIG. 3, when the wing (53) is depressed with the push button (5) to turn the circular pivot (51) for applying double braking to the caster, the protrusion on the circular pivot (51) is disengaged from the dent (61) in the upper end of the slider (6). Meanwhile, the slope (513) on the lower side of the circular pivot (51 ) pushes against along the slop (62) on the upper end of the slider (6). In turn, the arc concave (514) extending on the outer edge of the circular pivot (51) holds against the upper end of the slider (6) to push it move downward, and the slider (6) is held in position when retained by the gradation edge (515) provided at the terminal of the arc concave (514). Consequently, the slider (6) moving downward has the slope (63) at its lower end to push against the slope (72) provided at the upper end of the slider holder (7), thus to push forward the slider holder (7) to laterally move to compress the flexible member (76). Meanwhile, the fixation pin (74) moves along the guide slot (17) in the caster holder (1) to extend to hold against the groove (21) on the inner side of the caster (2) to apply braking to the caster (2). Furthermore, for being pushed by the flexible member (77), the retaining block (75) advances together with the slider holder (7) to merely push into the gaps (81) of the positioning ring (8) connected to the lower end of the shaft (4). Therefore, the caster holder (1) is simultaneously restricted from turning to achieve the dual purposes of the present invention to stop the caster and prevent it from turning.

I claim:

1. A caster braking and locking structure comprising a caster holder, two half casters, an axle, a shaft, a press button, a slider, a slider holder, a fixation pin, a retaining block and two flexible members; wherein, a shaft mouth is vertically formed at one end in an upper portion of the caster holder to receive the insertion of the shaft; a horizontal trough being laterally formed in a flush bottom of the caster holder in a semi-spherical shape; a recess connecting through the shaft mouth being upwardly provided at one end of the trough; a slot being formed in the shaft mouth in relation to where the trough connects to the recess; a guide slot being provided in each of two opposing sides at one end of the trough; a pin hole being provided at the other end of the trough; an axial hole for penetration of the axle being provided in the center of the trough at a bottom of the caster holder; the two half casters being respectively fixed to two ends of the axle; a plurality of grooves being formed on an inner side of at least one of the half casters; a positioning ring being connected to the shaft in relation to the slot; a plurality of gaps being provided at a periphery of the positioning ring; the slider holder being mounted in the trough at the bottom of the caster holder; a chute corresponding to the axial hole of the caster holder being formed at the center of the slider holder to allow penetration by the axle; a first of the flexible members pushing against the slider holder; the slider holder being biased to bear against a lower end of the slider; the other end of the slider holder being inserted with the fixation pin extending at least one guide slot of the caster holder; the retaining block provided in the slider holder at the end provided with the fixation pin to extend into the recess; the retaining block being pushed by a second of the flexible members laterally disposed in the slider holder; and the retaining block being retained in the side at the end of the slider holder;

a chute being vertically formed on the other end of the trough of the caster holder containing the slider holder; the slider being provided in the chute; a slope being defined the lower end of the slider to contact one end of the slider holder; a pivoting recess being formed in the upper portion of a side of the caster holder to communicate with the vertical chute; a pivotally displaceable press button having a circular pivot extending into the pivoting recess; a wing to be depressed being provided to the outer end of the circular pivot; a retaining surface being formed by the circular pivot to engage an upper end of the slider; and the slider moving downward when pushed by the circular pivot;

responsive to the press button being depressed, the circular pivot turning to push the slider downward, the slope of the slider bearing against the slider holder to move the slider holder laterally; the fixation pin responsively engaging one of the grooves on the inner side of at least one of the half casters; the retaining block being pushed by the second flexible member to extend together with the slider holder into the gaps of the positioning ring connected to the shaft; whereby the half casters and the caster holder are stopped and prevented from turning in any direction.

2. A caster braking and locking structure as claimed in claim 1, wherein, a recessed segment is provided below the circular pivot to serve as a retaining surface; a protrusion and a slope being respectively provided at the center and one side of the retaining surface; the retaining surface extending further towards to form an arc concave with a gradation edge at its terminal; and a dent and a slope being respectively provided on the upper end of the slider at where in relation to the protrusion and the slope.

3. A caster braking and locking structure as claimed in claim 1, wherein, the shaft is a graded body having a polygonal surface and a threaded rod at the lower portion; said shaft being engaged to a polygonal recess and a through hole provided inside the positioning ring, and secured with a nut to pack the positioning ring.

\* \* \* \* \*